United States Patent Office 3,392,390
Patented July 9, 1968

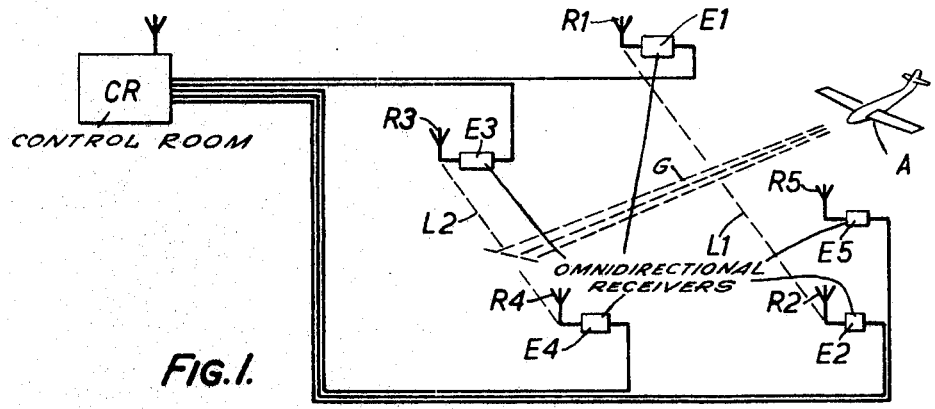
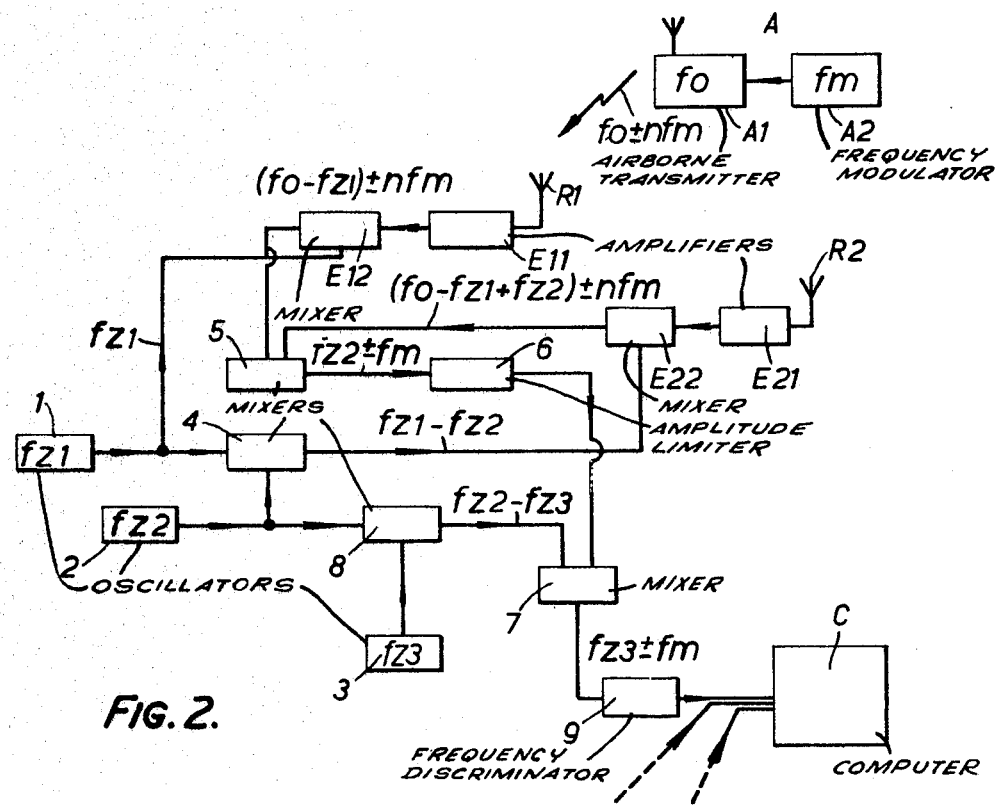

3,392,390
AIRCRAFT RADIO LANDING AIDS FOR DETERMINING THE POSITION OF AN AIRCRAFT IN SPACE RELATIVE TO A PREDETERMINED GLIDEPATH
Ernst Friedrich Schelisch, Hatfield Peverel, Essex, England, assignor to The Marconi Company Limited, London, England, a British company
Filed Feb. 25, 1966, Ser. No. 530,160
Claims priority, application Great Britain, Mar. 15, 1965,
10,932/65
9 Claims. (Cl. 343—112)

ABSTRACT OF THE DISCLOSURE

An aircraft radio landing aid wherein a simple frequency modulated transmitter is carried in the aircraft and five omni-directional receivers are located on the ground at points located about the required flight path of the aircraft. Two of the receivers lie on one line which is transverse to the flight path, a further two of the receivers lie on a second transverse line further along the flight path and the fifth receiver is on the approach side of said first-mentioned transverse line. The path length differences from the aircraft transmitter to the receivers, taken in pairs, are utilized by triangulation to identify the position in space of the aircraft.

This invention relates to aircraft radio landing aids, i.e. to radio aids which can be employed for directing an aircraft in to land (or, of course, to take off) via a pre-determined glide path on to (or from) a runway. The object of the invention is to provide improved radio landing aids which will enable the position of a landing aircraft to be determined with high accuracy during its approach; which require only very simple radio equipment to be carried on the aircraft; which do not require the use of directional aerials and which do not depend for accuracy upon the provision of receiving aerials having known, pre-determined, precisely maintained polar radiation diagrams so that it is possible to use on the ground very simple, small, non-directional aerials which can be flexibly mounted and therefore do not constitute dangerous obstructions to aircraft since they can be so designed that they can be struck by taxying aircraft without material risk of damage.

Aircraft radio landing aids commonly employed in airfields at present involve the use of radar equipment which treat a landing aircraft as a target and derive information as to its successive positions and movements in order to enable an air traffic control officer on the ground to direct the pilot to enable him to land in conditions of poor visibility—to "talk the aircraft down" as it is called. Other aids which are often provided include equi-signal beacons for defining the glide path and operating an indicator on the aircraft to inform the pilot if he is too high or too low and/or too far to starboard or to port and approach beacons over which an approaching aircraft flies and which inform the pilot when he is passing over them. Such equipments are elaborate and costly, require very careful maintenance and involve the use of ground sited aerial systems which are expensive and bulky, have to provide and maintain (for the preservation of accuracy) pre-determined polar radiation diagrams and must, from their very size and construction, be sited well clear of the paths which approaching and landing aircraft may follow.

According to this invention an aircraft radio landing aid comprises at least four spaced radio receivers on the ground and means for determining the difference of path length or distance from the aircraft to the receivers of each of a plurality of pairs of said receivers to determine aircraft position.

Preferably the receivers are adapted to receive frequency modulated waves non-directionally so that all that a co-operating aircraft (the pilot of which has equipment enabling him to receive landing directions from an air traffic control officer on the ground) must carry in order to use the aid is a simple non-directional frequency modulated transmitter.

Preferably there are five receivers comprising one pair in a line which is transverse to an intended glide path and between which said path passes, a second pair in a second line which is also transverse to said path and between which said path passes, said second line being further along the said path than said first line, and a fifth receiver which is on the approach side of said first line and is situated at or near a point under said path.

It will be observed that in a radio aid in accordance with this invention, the actual path lengths between an aircraft and a receiver are not measured as they are of course, by a radar set. What is measured is the difference between the path lengths from the aircraft to the receivers of one pair, the difference between the path lengths from the aircraft to the receivers of another pair, and so on, the various differences of path length measured being numerous enough to enable aircraft position to be determined unambiguously. It may be shown trigonometrically, that, if there are four receivers at the corners of a quadrilateral, it is possible to define the position of an aircraft in space unambiguously from a knowledge of the path length differences from the aircraft to the receivers, taken two at a time. In practice signals representative of the path length differences are fed to a computer which can be designed in manner known per se to provide information defining the position of the aircraft in any of a variety of different ways. In general the computer will be designed to provide that information in terms of height or of height deviation from a glide path, lateral deviation from said glide path and distance from a pre-determined "touch down" point, but the information can, of course, be arranged to be presented by the computer in other terms. The outputs from the computer may be arranged to operate indicators the readings of which provide an air traffic control officer with the necessary information to "talk down" an incoming aircraft and/or they may be arranged to operate signal transmitters adapted to transmit signals capable of operating suitable indicating instruments provided in the aircraft for directly informing the pilot of necessary flight corrections for proper approach and landing. Such instruments could include one of a form known per se and adapted to present an indication in the form of a light spot or the inter-section of two crossing needles against a cross background, the position of the spot or intersection (as the case may be) in relation to the point where the vertical and horizontal lines of the cross intersect indicating the position of the aircraft in relation to the glide path. They could also include an instrument indicating distance from a pre-determined "touch down" point at the end of the glide path.

In a preferred embodiment signals from the aerials of a pair are combined to produce signals representative of the path length difference from the aircraft to said pair, by means comprising a first mixer mixing the signals from one aerial with a local oscillation of one frequency; a second mixer mixing the signals from the other aerial with the difference frequency between said one frequency and local oscillations of a second frequency; a third mixer mixing the outputs from the first and second mixers to produce a frequency equal to said second local oscillation modulated by the received modulating frequency; a fourth mixer to which output from the third mixer is fed and the difference frequency between the second local oscillation frequency and a third local oscillation frequency is also fed to produce an output of frequency equal to said third local frequency modulated by the received modulating frequency; and a frequency discriminator or the like fed from the fourth mixer to produce an output representative of said path length difference. A sideband amplitude meter could, of course, be used for the required frequency discrimination instead of a frequency discriminator properly so-called and, therefore, the term "frequency discriminator means," as used herein, should be understood to include such a meter.

The invention is illustrated in the accompanying drawings in which—

FIGURE 1 is a schematic diagram showing a preferred airfield general arrangement for carrying the invention into effect and FIGURE 2 is a block diagram showing, inter alia, preferred interconnections for two of the receiving installations included in FIGURE 1.

Referring to FIGURE 1, G is a glide path which it is intended that a landing aircraft A shall follow. There are five receiving aerials R1 to R5 on the ground. These can be quite simple small open aerials and which may be flexibly mounted. R1 and R2 are at opposite ends of a line L1 the mid-point of which is underneath an intermediate point in the glide path. R3 and R4 are at opposite ends of a somewhat shorter line L2 the mid-point of which is under the glide path near the "touch down" point or which may pass through the "touch down" point. R5 is in the same vertical plane as the centre line of the glide path and in a position such that a correctly landing aircraft will pass over it before crossing the line R1–R2. The aircraft carries a frequency modulated non-directional transmitter on which no directional requirements are imposed. Signals from the aerials are passed, after amplification and frequency changing at nearby equipments E1 to E5 to the control room CR in which is housed further equipment including the customary radio telephone communication equipment. The nature of the equipments (other than the radio telephone) at E1 to E5 and at CR will be clear from the following description of FIGURE 2.

Referring now to FIGURE 2 the airborne transmitter A1 of the aircraft A transmits a carrier $f_o$ which is frequency modulated with a frequency $f_m$ by a modulator A2. The transmitted signal is $f_o \pm n f_m$ where $n$ is the sideband order number. This signal is received at the different aerials R1 to R5 after different delays T1 to T5 representative of the path lengths from the aircraft to the respective receiving aerials, only two of which (R1 and R2) are represented in FIGURE 2. Adjacent each aerial R1 and R2 is an amplifier E11 or E21 feeding into a mixer E12 or E22. The remainder of the apparatus in FIGURE 2 is at a central control point CR.

The second input to the mixer E12 is a local oscillator of frequency $f_{z1}$ from an oscillation 1 the output of which provides an input to a mixer 4 the second input to which is from an oscillator 2 of frequency $f_{z2}$. The output $f_{z1}-f_{z2}$ from mixer 4 is fed as the second input to the mixer E22.

The output $(f_o-f_{z1}) \pm n f_m$ from mixer E12 and the output $(f_o-f_{z1}+f_{z2}) \pm n f_m$ from mixer E22 are fed to a mixer 5. The output $f_{z2} \pm f_m$ from this mixer is limited in amplitude by a limiter 6 and fed as one input to a further mixer 7.

The local oscillation $f_{z2}$ from oscillator 2 is mixed in a further mixer 8 with local oscillations of frequency $f_{z3}$ from another oscillator 3 to produce the frequency $f_{z2}-f_{z3}$ and this is fed as the second input to the mixer 7. The output $f_{z3} \pm f_m$ from this mixer is fed to a frequency responsive amplifier or discriminator 9. The output signal from the discriminator 9 will be a frequency deviation representative of the difference between the propagation times from the aircraft to the two aerials R1 and R2, i.e. of the difference between the two path lengths. This output signal is fed to one input of a computer C which also receives inputs derived from other similarly connected pairs of the five receiving aerials. The computer is shown as having three inputs—derived, for example, from the aerial pairs R1R2; R3R4; and R1R5 respectively—and utilises these inputs in manner known per se to provide outputs definitive of momentary aircraft position, e.g. in terms of its height deviation from the glide path, its lateral deviation from the glide path and its distance from the "touch down" point. These outputs may be used to operate indicators in the control room to enable an air traffic control officer to "talk down" the aircraft and/or they may be used to transmit signals to operate flight directing instruments in the aircraft.

Obviously the various mixers will embody necessary filtering for selection of the various desired frequencies. Obviously also there will in practice be provided delay balancing circuits to ensure that unavoidable delays in the various parts of the equipment will not cause the operating inputs to the computer to be other than representative of differences between aircraft-receiver aerial propagation times as required.

I claim:

1. An aircraft radio landing aid comprising at least four spaced radio receiver means on the ground for receiving modulated transmissions originating from an aircraft carried transmitter and means for determining the difference of path length from the aircraft to the receivers of each of a plurality of pairs of said receivers to determine aircraft position, said means for determining the difference of path length comprising means for producing a local oscillation, means for mixing said local oscillation with signals received by a first receiver of one of said pairs of receivers, means for combining the output from said means for mixing with the signal received by the remaining receiver of said one pair of receivers for producing a base difference frequency signal having a frequency modulating component representative of said difference in path length.

2. An aircraft radio landing aid as claimed in claim 1 wherein the receivers are adapted to receive frequency modulated waves non-directionally.

3. An aircraft radio landing aid as claimed in claim 1 wherein there are five receivers comprising two receivers in a line which is transverse to an intended glide path and between which said path passes, a further two receivers in a second line which is also transverse to said path and between which said path passes, said second line being further along the said path in the direction of aircraft travel than said first line, and a fifth receiver which is on the approach side of said first line and is situated approximately at a point under said path.

4. An aircraft radio landing aid as claimed in claim 1 wherein signals from the aerials of a pair of receivers are combined to produce signals representative of the path length difference from the aircraft to said pair, by means comprising a means for generating a local oscillation of one frequency and a first mixer mixing the signals from one aerial with said local oscillation of one frequency; means for generating a local oscillation of a second frequency and a second mixer mixing the signals from the other aerial with the difference frequency between said one frequency and said local oscillations of a second frequency; a third mixer mixing the outputs from the first and second mixers to produce a frequency equal to said second local oscillation modulated by the received modulating frequency; means for generating a local oscillation of a third frequency and a fourth mixer to which output from the third mixer is fed and the difference frequency between the second local oscillation frequency and said third local oscillation frequency is also fed to produce an output of frequency equal to said third local frequency modulated by the received modulating frequency; and frequency discriminator means fed from the fourth mixer to produce an output representative of said path length difference.

5. An aircraft radio landing aid as claimed in claim 4 wherein said frequency discriminator means comprises means responsive to sideband amplitude and fed from said fourth mixer for producing an output representative of said path length difference.

6. In an aircraft radio landing aid; means for producing a signal representative of the difference in distances between a first reference point and an aircraft in flight and a second reference point and said aircraft, comprising first and second radio receivers located at said first and second points, responsive solely to signals from said aircraft, and means interconnecting said first and second radio receivers for combining the signals received thereby into said difference representative signal, said means for combining comprising frequency modulation means for providing a signal having a base frequency modulated by a frequency component representing said difference in distances and comprising frequency components of each of the signals received by said first and second receivers from said aircraft.

7. In an aircraft radio landing aid according to claim 6, third and fourth radio receivers located at third and fourth reference points, responsive solely to signals from said aircraft, and further means interconnecting said third and fourth radio receivers for combining the signals received thereby into a further signal representative of the difference in distances between said third reference point and said aircraft and said fourth reference point and said aircraft.

8. In an aircraft radio landing aid according to claim 7, a fifth radio receiver located at a fifth reference point, responsive solely to signals from said aircraft, and third means interconnecting said fifth radio receiver with one of said first, second, third and fourth radio receivers for combining the signals received thereby into a further signal representative of the difference in distance between said fifth reference point and said aircraft and one of said first, second, third and fourth reference points and said aircraft.

9. Distance difference signal producing apparatus for use in an aircraft radio landing aid comprising at least one pair of first and second spaced radio receivers for providing first and second radio receiver signals at the output thereof and local oscillator means for producing signals of first, second and third frequencies; said apparatus comprising a first mixer, a second mixer and a third mixer electrically connected to the outputs of said first and second mixers, said first mixer having first input means for electrical connection to a first radio receiver output and second input means for energization by a signal of said first frequency, said second mixer having first input means for electrical connection to a second radio receiver and second input means for energization by signals of said first and second frequencies, a fourth mixer electrically connected to the outputs of said third mixer and having input means for energization by signals of said second and third frequency and output means for providing an output signal representative of the difference between signals applied to said first input of said first mixer and said first input of said second mixer.

References Cited
UNITED STATES PATENTS

| | | | |
|---|---|---|---|
| 2,406,953 | 9/1946 | Lewis | 343—112 |
| 2,479,567 | 8/1949 | Hallman | 343—104 |
| 2,748,385 | 5/1956 | Rust et al. | 343—108 |
| 3,004,258 | 10/1961 | Cohen et al. | 343—112 |
| 3,064,929 | 11/1962 | Gard | 343—113 |

RODNEY D. BENNETT, *Primary Examiner.*

H. C. WAMSLEY, *Assistant Examiner.*